United States Patent [19]

Mitsuhashi

[11] Patent Number: 5,182,683

[45] Date of Patent: Jan. 26, 1993

[54] POSITION CONTROL OF A MAGNETIC HEAD IN A MAGNETIC RECORDING AND REPRODUCING SYSTEM

[75] Inventor: Yasuo Mitsuhashi, Nagaokakyo, Japan

[73] Assignee: Mitsubishi Denki Kabushiki Kaisha, Tokyo, Japan

[21] Appl. No.: 541,943

[22] Filed: Jun. 22, 1990

[30] Foreign Application Priority Data

Jul. 18, 1989 [JP] Japan ................... 1-185299

[51] Int. Cl.⁵ .............................. G11B 5/588
[52] U.S. Cl. ...................... 360/77.16; 360/70
[58] Field of Search ............. 360/73.09, 73.11, 73.13, 360/73.12, 70, 77.13–77.17

[56] References Cited

U.S. PATENT DOCUMENTS

| | | |
|---|---|---|
| 4,104,684 | 8/1978 | Wakami et al. . |
| 4,127,881 | 11/1978 | Wakami et al. . |
| 4,568,986 | 2/1986 | Furuhata et al. . |
| 4,581,658 | 4/1986 | Azuma et al. . |
| 4,882,635 | 11/1989 | Sanai .................... 360/77.16 |

FOREIGN PATENT DOCUMENTS

| | | |
|---|---|---|
| 0302696 | 2/1989 | European Pat. Off. ......... 360/77.13 |
| 63-67253 | 12/1988 | Japan . |
| 1-96817 | 4/1989 | Japan ............... 360/77.13 |

*Primary Examiner*—Jerry Smith
*Assistant Examiner*—Steven R. Garland
*Attorney, Agent, or Firm*—Birch, Stewart, Kolasch & Birch

[57] ABSTRACT

A magnetic recording and reproducing apparatus for reproducing information from a track recorded on a magnetic tape made to travel by being driven by a capstan. Even if a track has been recorded in a curved form, a magnetic head is displaced substantially perpendicularly to a rotational axis of a rotating drum in correspondence with the curve so as to trace the track. A signal read from the track by the magnetic head is subjected to envelope detection and is converted to a digital envelope signal. The capstan is driven and controlled such that the intensity of the digital envelope signal becomes substantially maximum. At the same time, a comparison is made between an ideal scanning pattern for the magnetic head stored in advance and the digital envelope signal, the ideal scanning pattern is corrected on the basis of the result of comparison, and the magnetic head is displaced in a substantially perpendicular direction to the rotational axis of the rotating drum so that the intensity of the envelope signal becomes substantially maximum. The magnetic head is affixed to a projecting portion of an annular spring with an air-core bobbin fitted in a central portion thereof and is displaced by magnetic interaction between an energizing coil wound around the bobbin and a permanent magnet disposed inside the air-core bobbin.

10 Claims, 16 Drawing Sheets

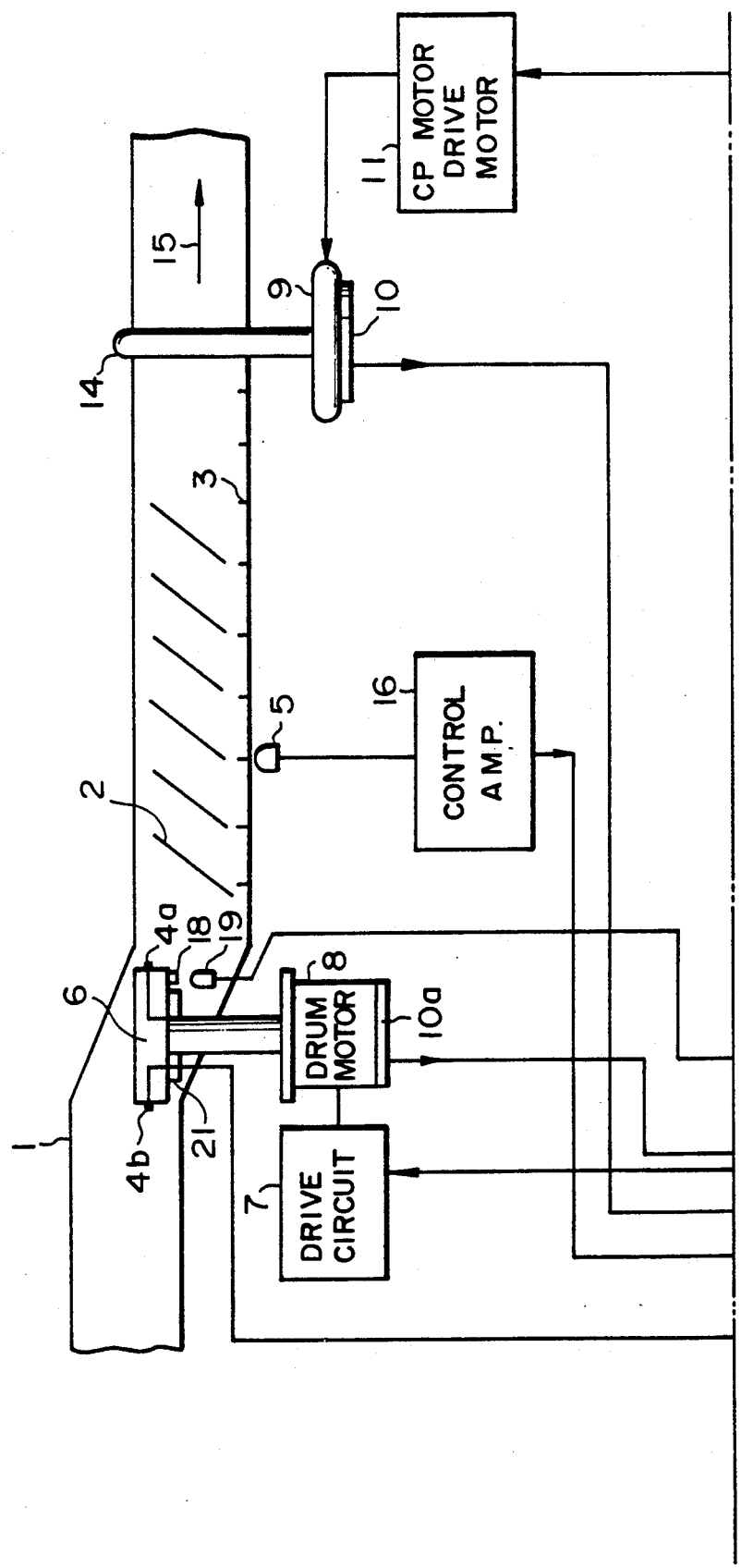

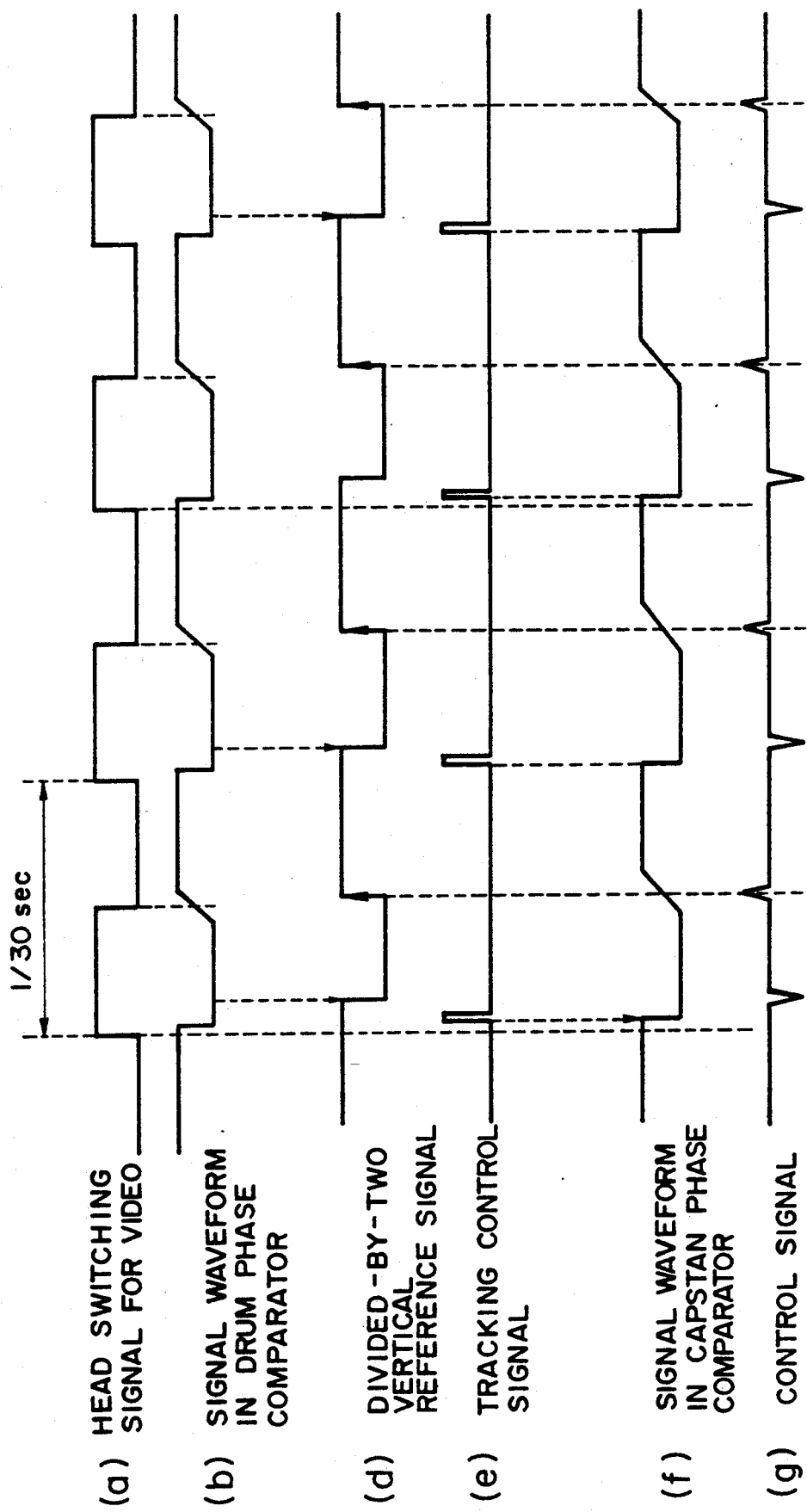

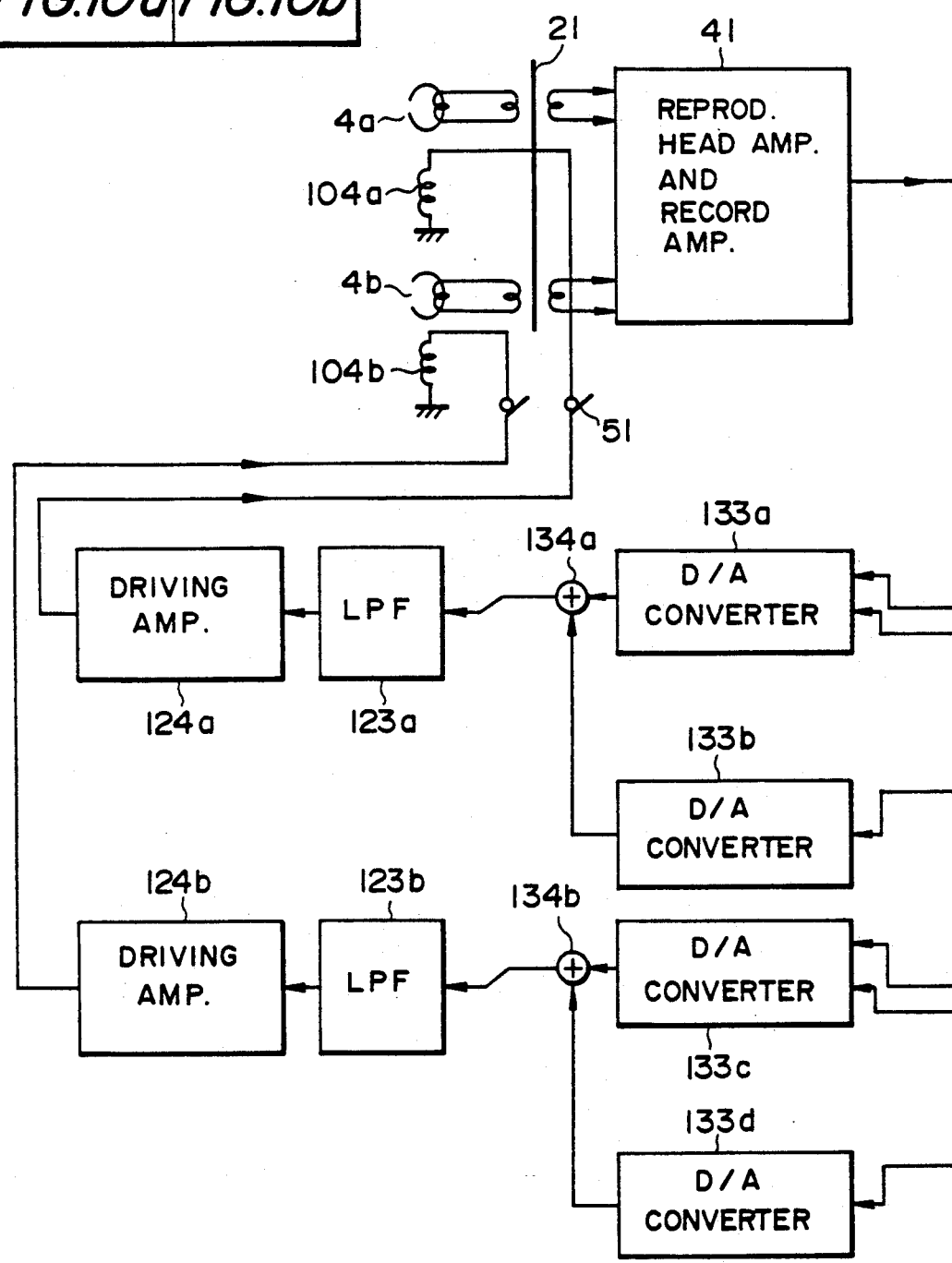

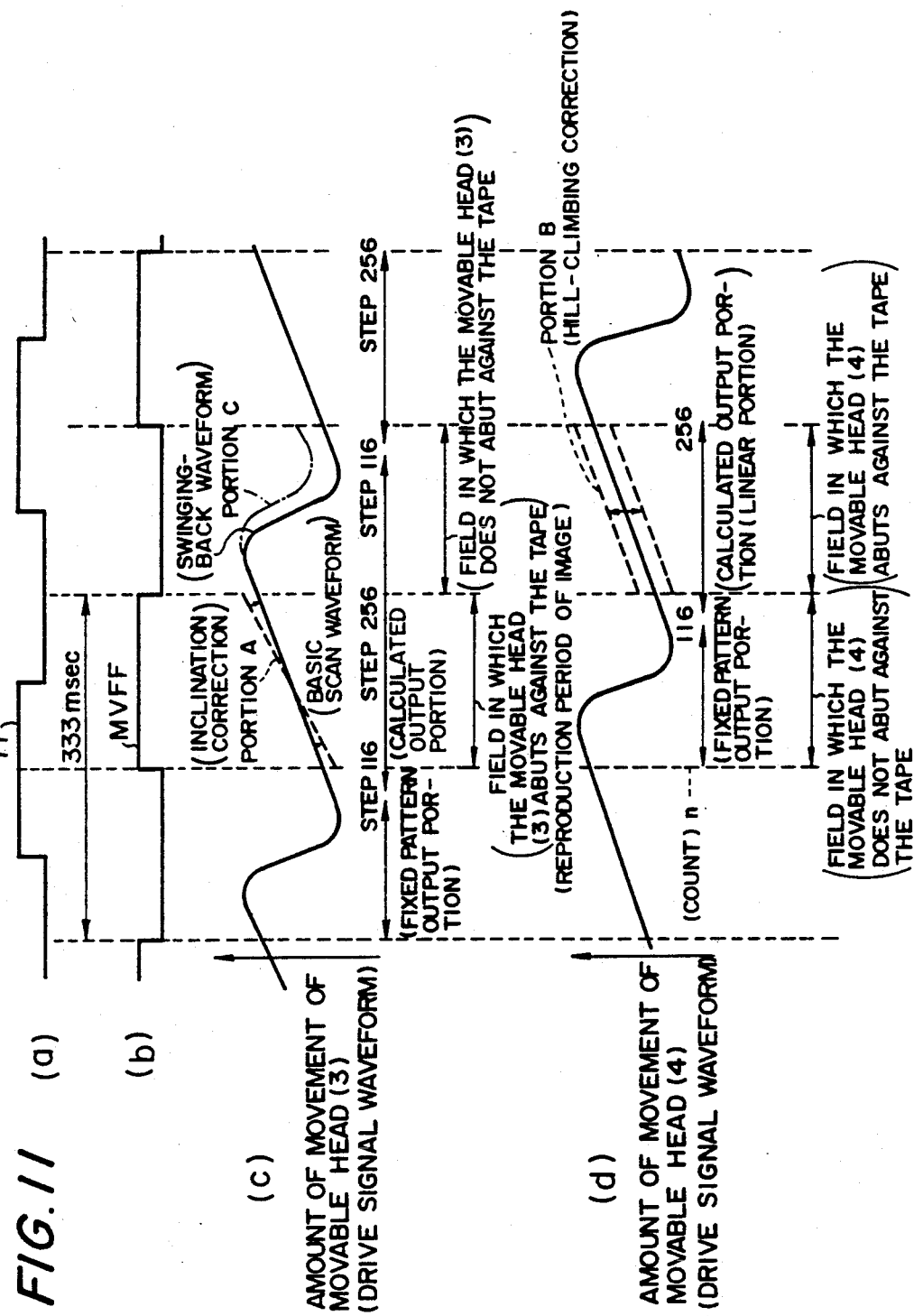

POSITION CONTROL OF A MAGNETIC HEAD IN A MAGNETIC RECORDING AND REPRODUCING SYSTEM

BACKGROUND OF THE INVENTION

The present invention relates to a magnetic recording and reproducing apparatus (hereinafter referred to as the "VTR") of a high picture quality pursuing type provided with an automatic tracking control system.

FIG. 12 is a diagram schematically illustrating a configuration of an automatic tracking control system of a conventional VTR disclosed in, for instance, Japanese Patent Publication No. 51256/1980 or 51257/1980.

In the drawing of FIG. 12, reference numeral 1 denotes a magnetic tape. Written on the magnetic tape 1 are video tracks 2 with video signals recorded thereon as well as control tracks 3 on which control signals used for tracking servo during reproduction are recorded. Magnetic heads 4A, 4B, which are used for reproducing the video signals, are mounted on a rotating drum 6. The rotating drum 6 is rotated at a predetermined speed by a drum motor 8 through control by a drum motor drive circuit 7. A fixed control head 5 is adapted to reproduce control signals.

A frequency generator 10 generates a frequency signal (hereinafter referred to as the FG signal) proportional to the rotating speed. The magnetic tape 1 is driven in the direction of arrow a via a pulley 12, a belt 13, and a capstan 14 by a capstan motor (hereinafter referred to as the CP motor) 9 whose drive is controlled by a capstan motor drive controlling circuit (hereafter referred to as the CP motor drive controlling circuit ) 11.

A control amplifier 16 amplifies the control signal, and a phase comparator 17 receives as one of its inputs the control signal amplified by the amplifier 16. A phase adjusting circuit 20 adjusts the phase of a rotational phase signal obtained by detecting a magnetic piece 18 affixed to the rotating drum 6 by means of a fixed detection head 19, i.e., a rotational angle signal of the two magnetic heads 4A, 4B. This phase adjusted signal is used as the other input for the phase comparator 17. An error signal of the phase comparator 17 is applied to the CP motor drive controlling circuit 11.

A video FM signal reproduced by the magnetic heads 4A, 4B is fetched by a rotary transformer 21, and is then amplified by a head amplifier 22 and supplied to an envelope detection circuit 23. An output of the head amplifier 22 is also supplied to a peak hold circuit 24 which holds a maximum value $V_p$ of an envelope signal. An envelope detection signal $V_e$ which is an output of the envelope detection circuit 23 and the output signal $V_p$ of the peak hold circuit 24 are applied to a comparator 25.

The output of the comparator 25 is supplied to a differential circuit 26. A flip-flop circuit 27 generates an output voltage polarity of positive and negative by means of an output of the differential circuit 26. An integration circuit 28 integrates the output of the flip-flop circuit 27 and controls the phase of the phase adjusting circuit 20 in correspondence with its output polarity.

The operation of the above-described configuration will be described hereinunder.

The CP motor 9 is driven and controlled as the FG signal generated by the frequency generator 10 is applied to the CP motor drive controlling circuit 11. The magnetic tape 1 is hence driven in the direction of arrow a in FIG. 12 via the pulley 12, the belt 13, and the capstan 14, and the drum motor 8 is rotatively driven at a predetermined rotating speed via the drum motor drive circuit 7. At this time, the control signal reproduced by the control head 5 and amplified by the control signal amplifier 16 is applied to one input terminal of the phase comparator 17. At the same time, the signal phase-adjusted by the phase adjusting circuit 20 by means of the rotational phase signal obtained by detecting the magnetic piece 18 affixed to the rotating drum 6 by means of the detection head 19 is applied to the other input terminal of the phase comparator 17.

The error signal out of the phase comparator 17 is applied to the CP motor drive controlling circuit 11 so as to finely control the CP motor 9 being driven at a speed in the vicinity of a substantially predetermined speed by this drive controlling circuit 11, thereby controlling the travel of the magnetic tape 1 such that the rotational phase of the magnetic heads 4A, 4B and the reproduction phase of the control signal assume the relationships of phase determined by the phase adjusting circuit 20. As a result, the magnetic heads 4A, 4B scan fixed relative positions of the tracks 2 for the video signals determined by the phase adjusting circuit 20.

Meanwhile, the video FM signal reproduced by the magnetic heads 4A, 4B is fetched by the rotary transformer 21 and is then amplified by the head amplifier 22 and input to the envelope detection circuit 23, where the detected envelope signal is applied to the comparator 25.

The output of the head amplifier 22 is also applied to the peak hold circuit 24, and the output of this peak hold circuit 24 and the output of the envelope detection circuit 33 are supplied to the comparator 25. The comparator 25 makes a comparison between the output voltage $V_p$ of the peak hold circuit 24 and the output voltage $V_e$ of the envelope detection circuit 23, and determines whether a voltage differential between them is smaller than a threshold $e_0$ which has been appropriately set.

Then, the output of the comparator is supplied to the differential circuit 26 which generates positive and negative pulses each time the output of the comparator 25 is reversed. The flip-flop circuit 27 is triggered only by the negative pulses of the differential circuit 26, thereby changing its state between positive and negative voltage levels. The output of the flip-flop circuit 27 is supplied to the integration circuit 28 so as to be subjected to integration. Thus the output of the flip-flop circuit 27 is converted to a signal corresponding to the output voltage polarity of the flip-flop circuit 27 in order to control the phase of the phase adjusting circuit 20.

Now, if it assumed that the phase of the phase adjusting circuit 20 is in the state of a shown in FIG. 13, that the output voltage of the flip-flop circuit 27 is at a positive voltage level, and that the output of the integration circuit 28 is in an increasing direction, the phase of the phase adjusting circuit 20 changes in the increasing direction of b and then toward c. Concurrently, the output of the envelope detecting circuit 23 gradually increases and then assumes a decreasing direction again after reaching a maximum envelope value indicated by a broken line 30 in FIG. 13. Accordingly, because when the phase of the phase adjusting circuit 20 is set in the state of d, the difference between the output voltage $V_e$ of the envelope detecting circuit 23 and the output voltage $V_{p\,max}$ of the peak hold circuit 24, i.e., the maximum envelope voltage indicated by the broken line 30 in FIG. 13, becomes the predetermined threshold value $e_0$ of the comparator 25 indicated by a broken line 31 in FIG. 13. Accordingly, the comparator 25 shifts from the positive level to the negative level, with the result that the differential circuit 26 generates a negative pulse, thereby causing the flip-flop circuit 27 to shift to the negative voltage level. Consequently, the output of the integration circuit 28 begins to decrease, and the phase of the phase adjusting circuit 20 decreases again, shifting in the direction from d to c.

As described above, tracking adjustment is carried out by effecting control such that as the phase of the phase adjusting circuit 20 fluctuates from b to d, the output voltage of the envelope detecting circuit 23 fluctuates between the voltage levels indicated by the broken lines 30 and 31, and by setting the threshold value $e_0$ to an appropriate level.

The conventional VTR is arranged as described above, and coordination between the control signal and the positions in which the magnetic heads jump in (or jump out) is controlled. Hence, although the automatic tracking function is accomplished in cases where the recorded tracks are rectilinear, as shown in FIG. 5(a), in cases where the recorded state of the recorded video tracks is poor and the tracks are curved, as shown in FIG. 5(b), it is impossible for the magnetic heads to follow the field tracks having such curves. Thus there has been a problem in that the above-described arrangement is insufficient as a tracking function of a VTR for which high-quality pictures are pursued.

SUMMARY OF THE INVENTION

Accordingly, an object of the present invention is to provide a magnetic recording and reproducing apparatus which is capable of controlling positions in which magnetic heads jump in and which, even with tape whose recorded state is poor with field tracks curved over the recorded track lengths, is capable of allowing the magnetic heads to trace the field tracks along their curves during reproduction, thereby overcoming the above-described problem of the conventional art.

To this end, according to the present invention, there is provided a magnetic recording and reproducing apparatus for reproducing information from a track recorded on a magnetic tape made to travel by being driven by a capstan, the apparatus comprising: a rotating drum; a magnetic head provided on the rotating drum in such a manner as to project from an outer peripheral portion thereof by a predetermined amount; detection means for subjecting a signal read from the track by the magnetic head to envelope detection and converting the signal to a digital envelope signal; tracking controlling means for controlling the driving by the capstan such that the intensity of the digital envelope signal output from the detection means becomes substantially maximum; correction means for outputting a tracking correction signal such that the intensity of the digital envelope signal output from the detection means becomes maximum; and magnetic head driving means for causing the magnetic head to be displaced substantially perpendicularly to a rotational axis of the rotating drum on the basis of the tracking correction signal so as to trace the track.

An FM video signal read from the track by the magnetic head is subjected to envelope detection is then converted to a digital envelope signal. The capstan is driven and controlled by automatically determining an amount of tracking in such a manner that the intensity of this digital envelope signal becomes substantially maximum.

In addition, the magnetic head is displaced in a substantially perpendicular direction to the rotational axis of the rotating drum in such a manner that the intensity of the digital envelop signal always becomes substantially maximum within a scanning period for one field, thereby allowing even a curved track to be automatically traced.

Thus, by allowing the magnetic head to trace a field track by being displaced in this manner, the FM signal can be picked up accurately, and crosstalk components from adjacent tracks can be minimized, thereby making it possible to obtain a high-quality picture.

BRIEF DESCRIPTION OF THE DRAWINGS

FIGS. 1, and 1a-1c are a schematic diagram of a magnetic recording and reproducing apparatus in accordance with an embodiment of the present invention, illustrating a system configuration for determining the tape speed and an amount of tracking;

Figure 1B:
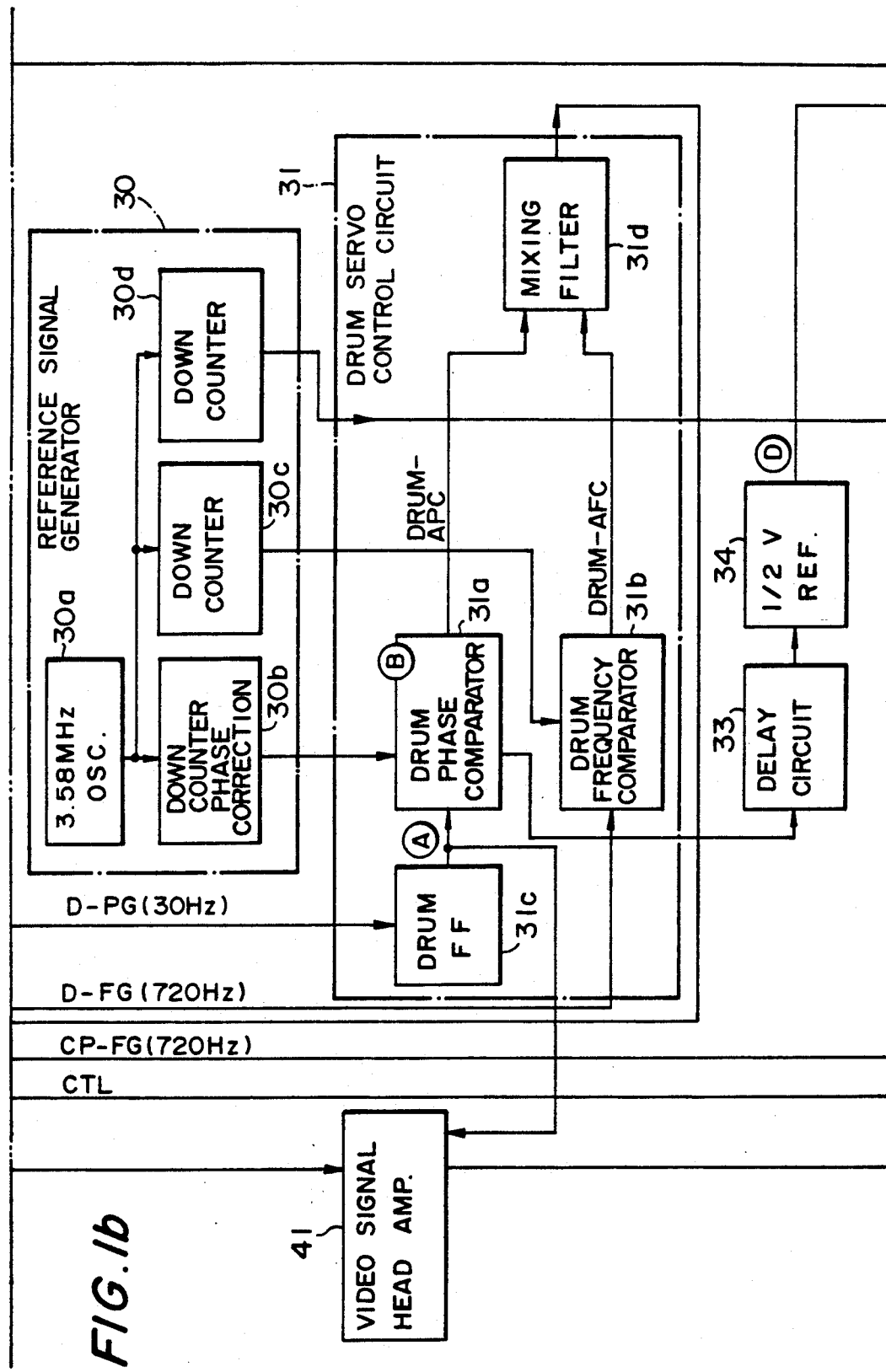
Figure 1C:
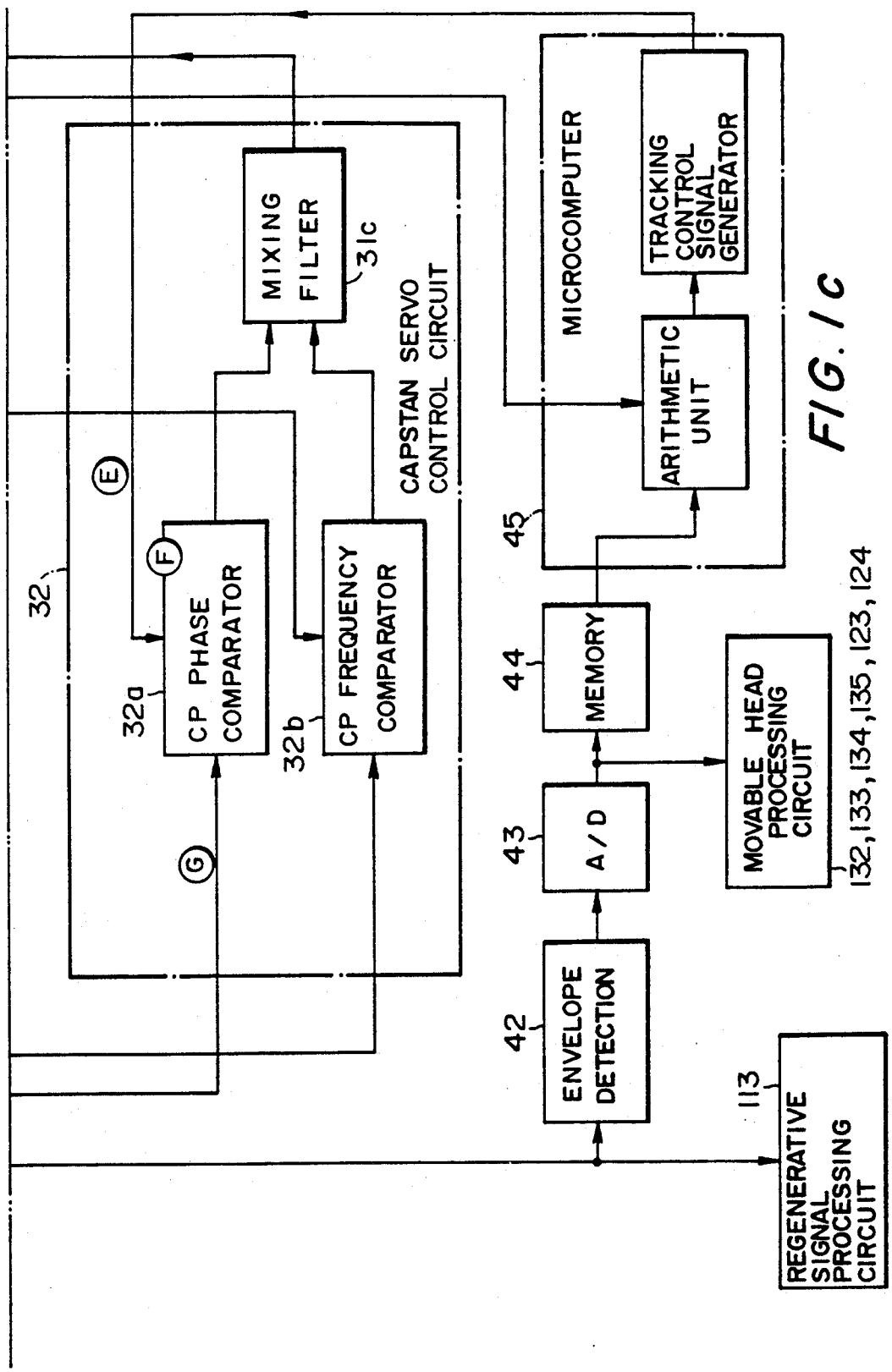
Figure 3:
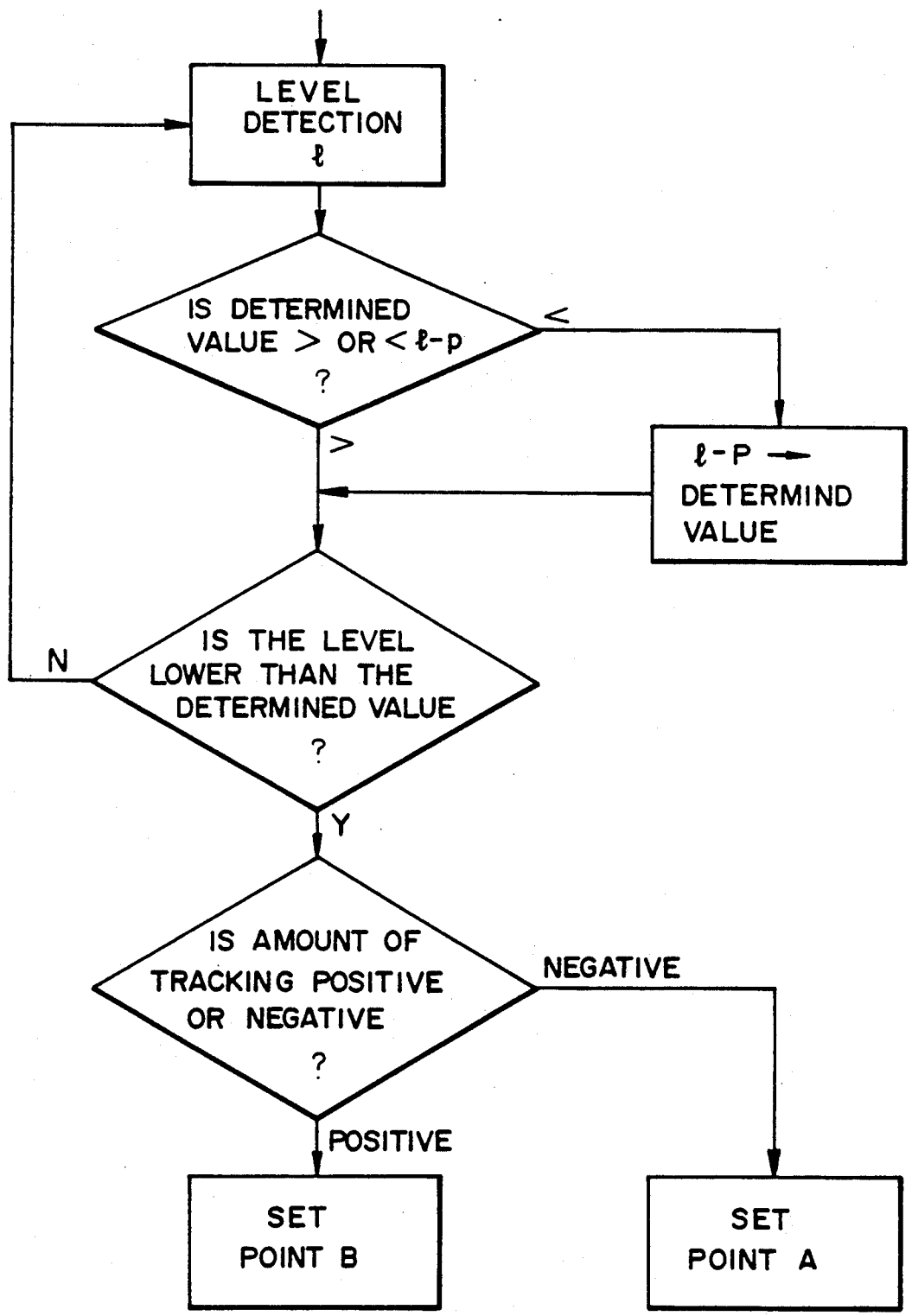
Figure 4:
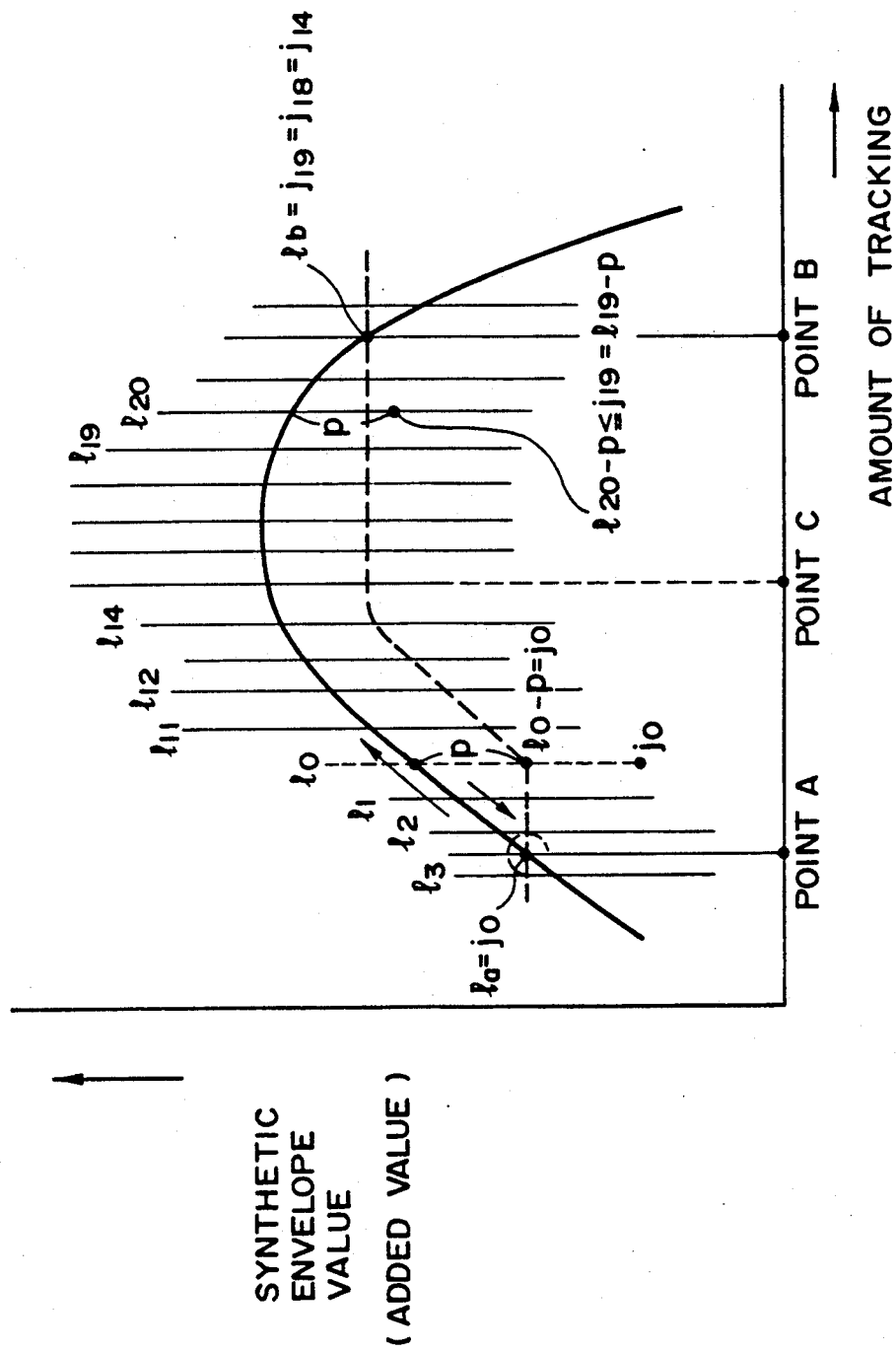
Figure 5A:
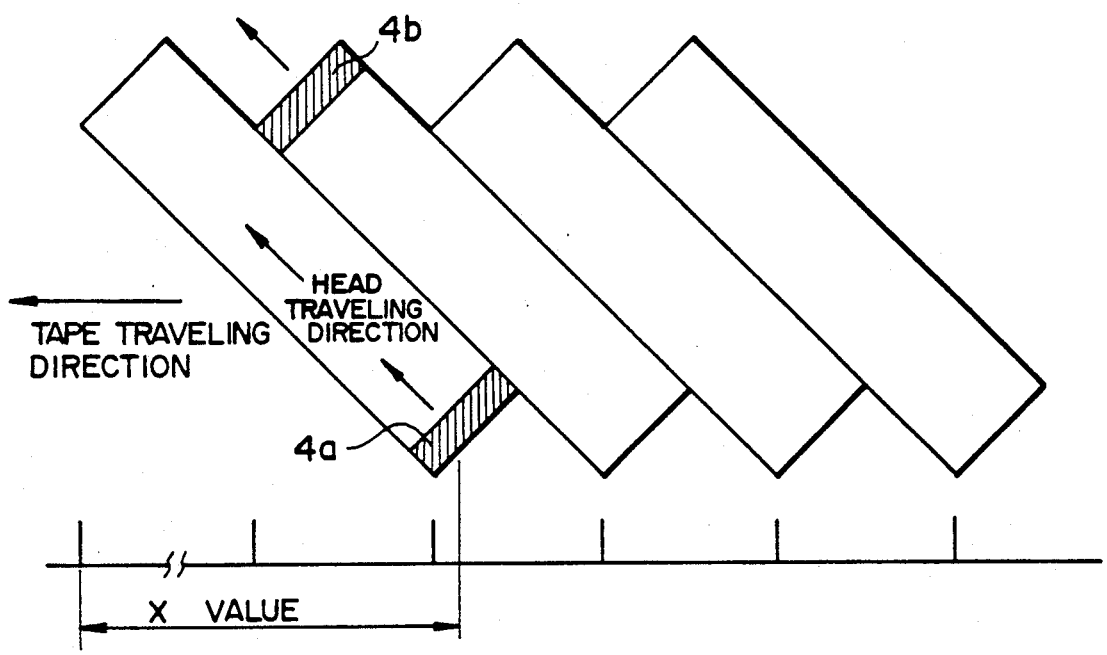
Figure 5B:
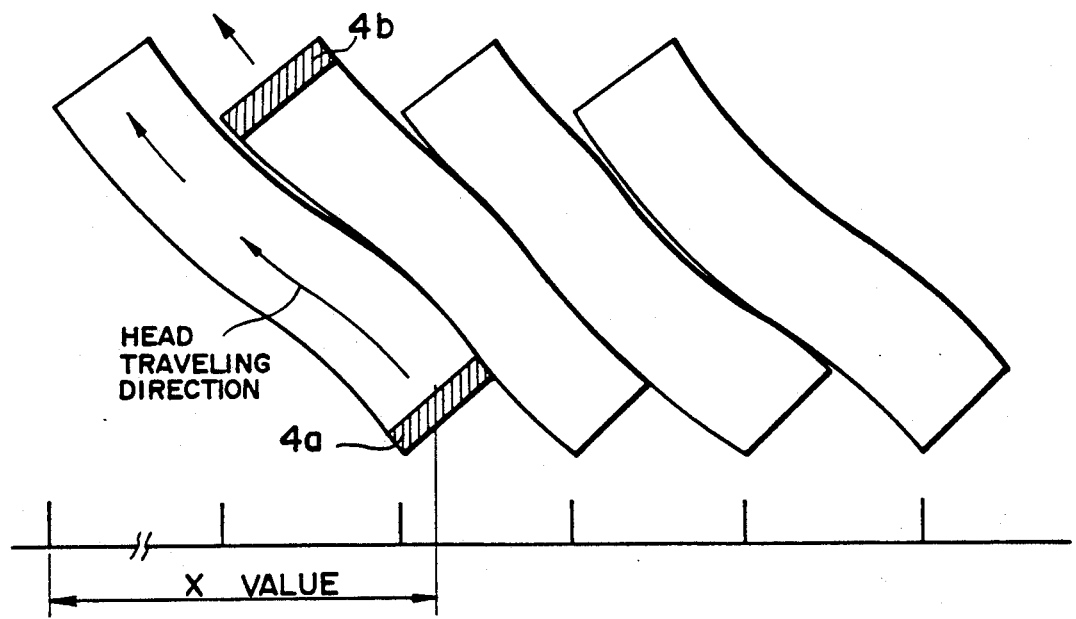
Figure 6:
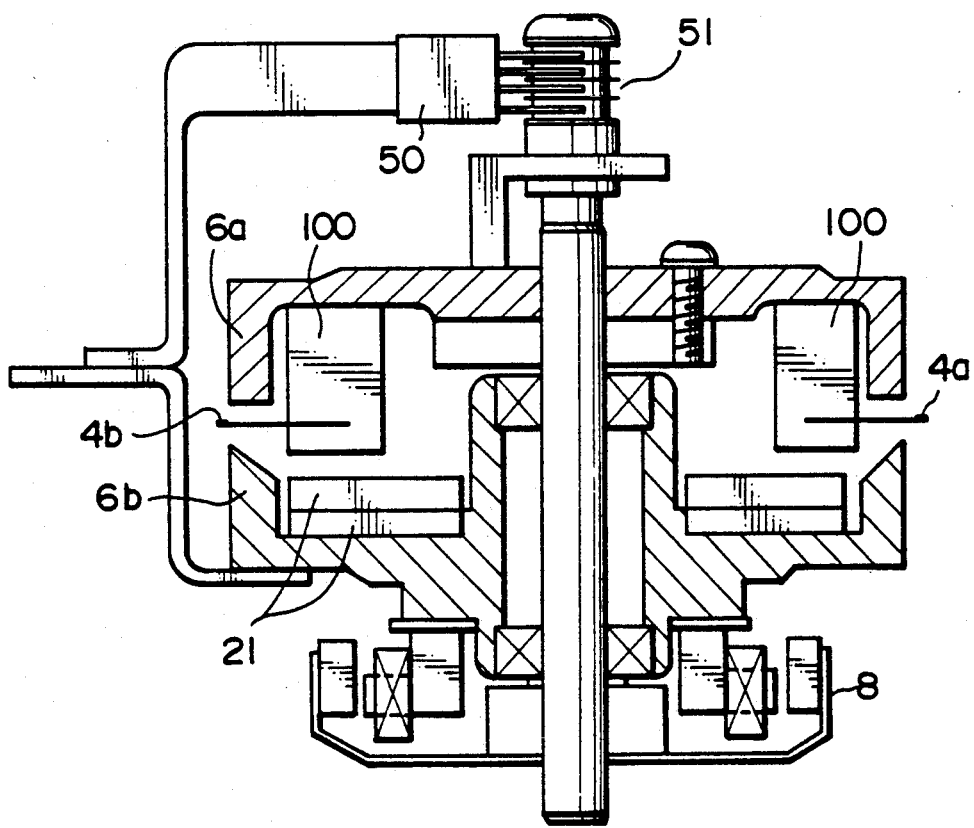
Figure 7A:
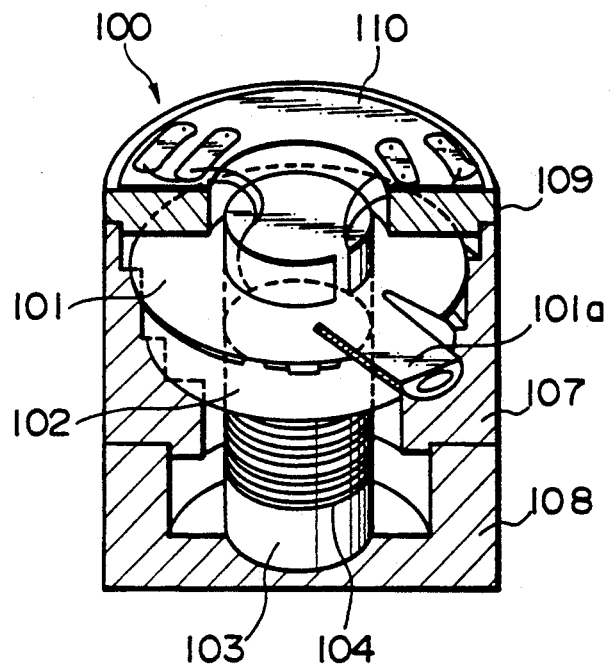
Figure 7B:
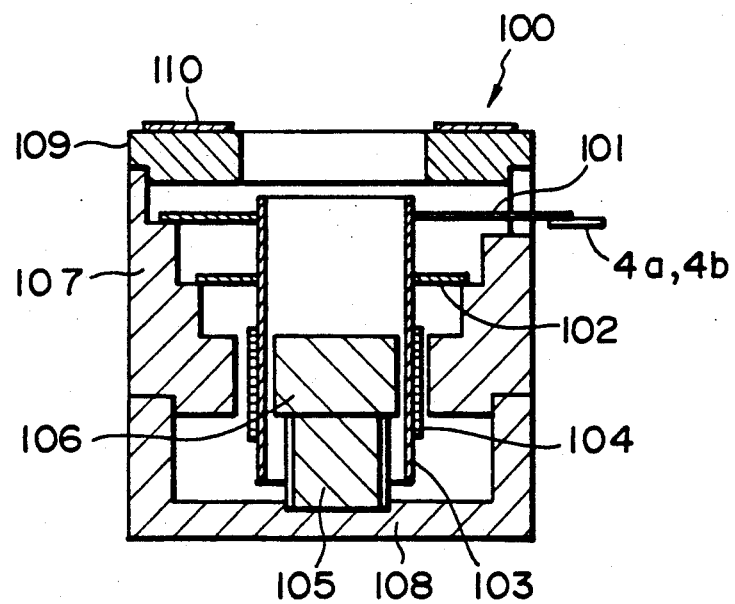
Figure 8A:
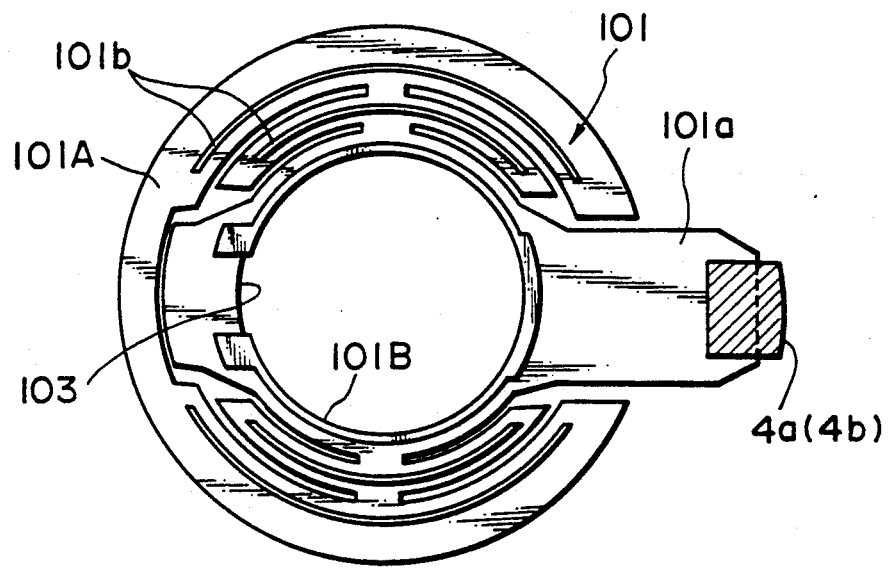
Figure 8B:
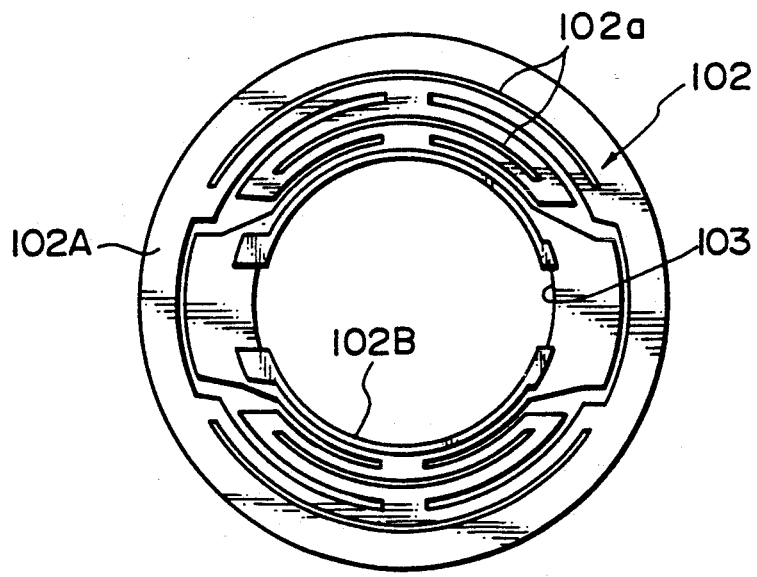
Figure 9:
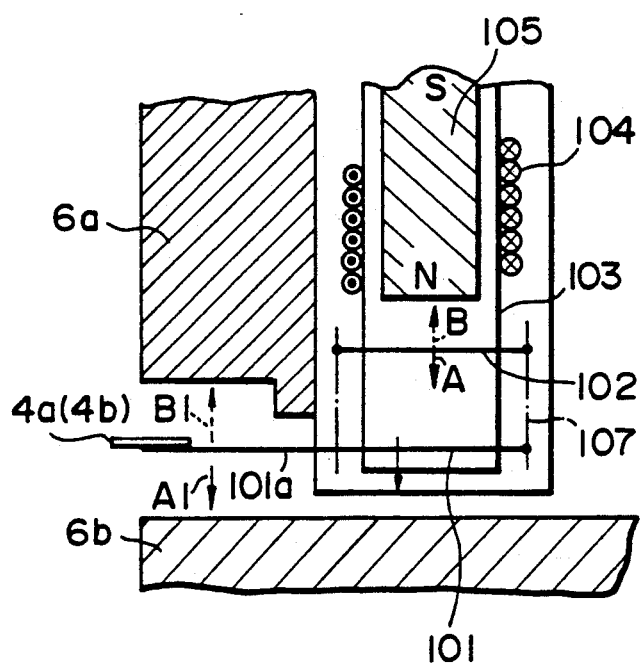
Figure 10B:
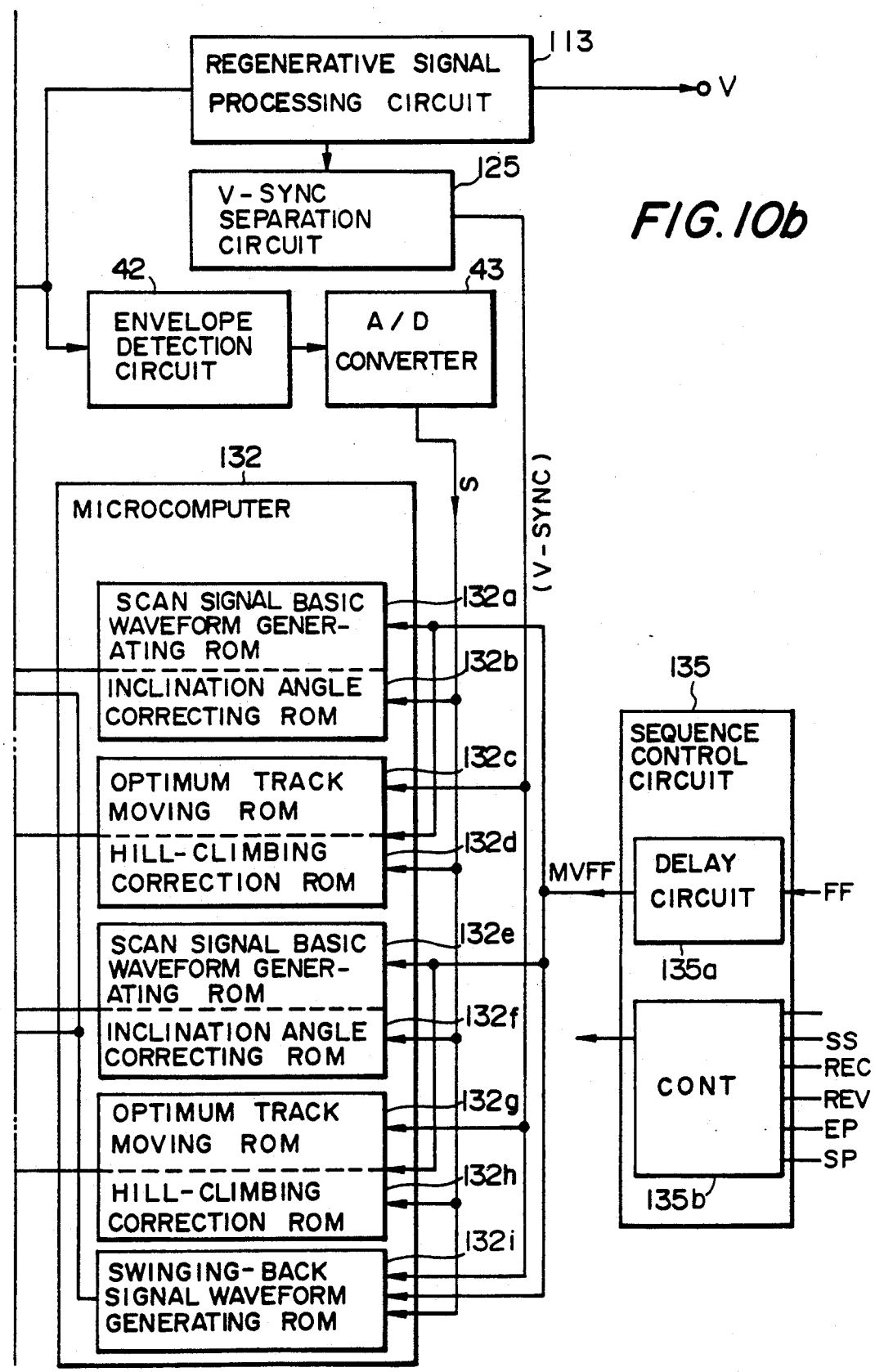
Figure 12:
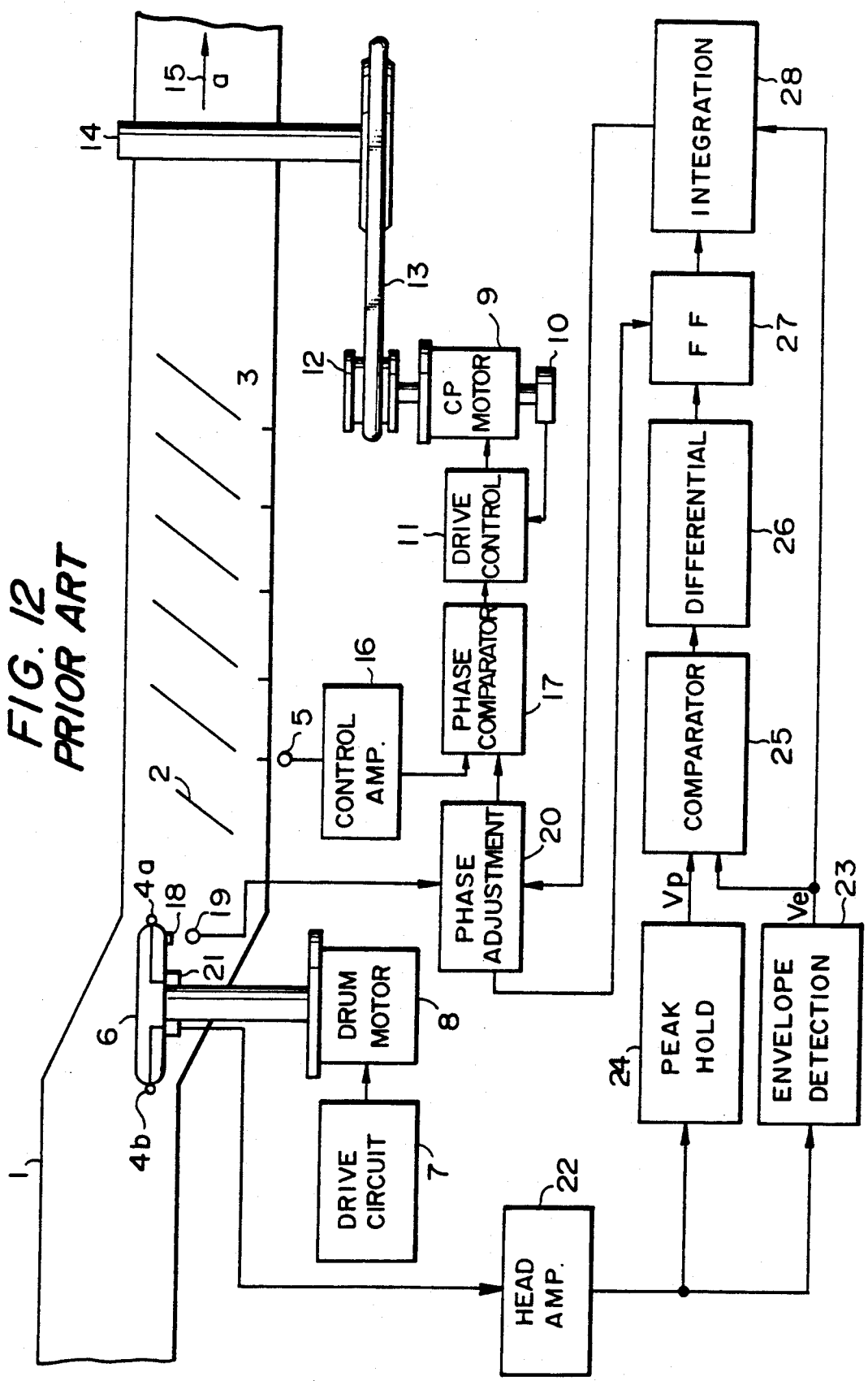
Figure 13:
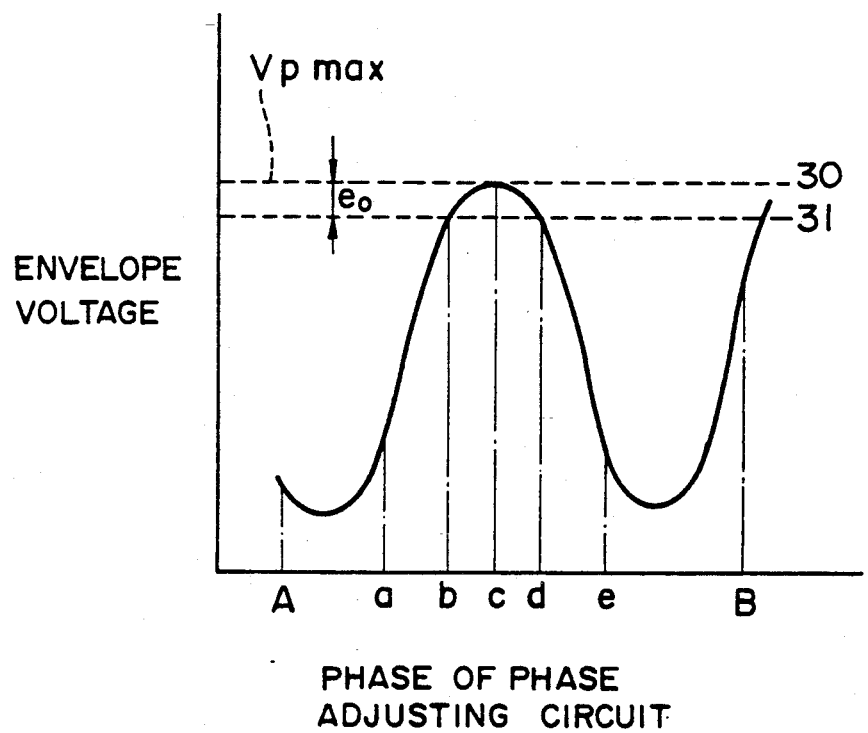

The parts (a) to (g) of FIG. 2 are signal waveform diagrams of respective components of the apparatus shown in FIG. 1;

FIG. 3 is a flowchart of signal processing in a microcomputer in accordance with the embodiment;

FIG. 4 is a waveform diagram explaining the operation of the flowchart;

FIGS. 5(a) and 5(b) are diagrams illustrating how the recorded tracks of the tape are traced by reproducing heads, in which FIG. 5(a) is a diagram illustrating a tracing path of the head at the time of reproducing a picture using ideal tape whose linearity of the recorded tracks is good;

FIG. 5(b) is a diagram illustrating a tracing path of the head at the time of reproducing a picture using tape whose linearity of the recorded tracks is poor;

FIG. 6 is a vertical cross-sectional view illustrating a structure of a rotating drum unit in accordance with the embodiment;

FIGS. 7(a) and 7(b) are a perspective cross-sectional view and a vertical cross-sectional view respectively illustrating an arrangement of a head unit;

FIGS. 8(a) and 8(b) are enlarged horizontal cross-sectional views respectively illustrating an arrangement of a circular spring;

FIG. 9 is a vertical cross-sectional view schematically illustrating an essential portion explaining an operating principle of the head unit;

FIGS. 10, 10a, and 10b are a block diagram of an electrical circuit illustrating a configuration of track tracing;

FIG. 11 is a signal waveform diagram explaining the operation of track tracing;

FIG. 12 is a diagram illustrating a conventional example of an automatic tracking control system; and FIG. 13 is a diagram explaining the operation thereof.

DESCRIPTION OF THE PREFERRED EMBODIMENTS

Referring now to the accompanying drawings, a description will be given of the embodiments of a magnetic recording and reproducing apparatus in accordance with the present invention.

In FIG. 1, component parts 1-11, 14-16, 18, 19, and 21 are provided with the same functions as those of the components denoted by the same reference numerals in the conventional example shown in FIG. 12. A reference signal generator 30 is adapted to supply a reference signal for operating both the rotating drum 6 and the capstan 14. In the case of an NTSC system, the reference signal generator 30 comprises a 3.58 MHz oscillating circuit 30a, down-counters 30c, 30d for counting down this oscillated signal, and a down-counter phase correction circuit 30b. A drum servo control circuit 31 causes the rotating drum 6 to rotate accurately at 1,800 r.p.m. and controls the rotational phases of the magnetic heads 4a, 4b. The drum servo control circuit 31 comprises a drum phase comparator 31a, 31b, a drum flip-flop signal generating circuit 31c, and a mixing filter circuit 31d for mixing and smoothing outputs of the two comparators 31a, 31b.

A capstan servo control circuit 32 causes the capstan 14 to rotate at a predetermined speed and causes the magnetic tape 1 to travel at a predetermined speed and at a predetermined tracking position. The capstan servo control circuit 32 comprises a CP phase comparator 32a, a CP frequency comparator 32b, and a mixing filter circuit 31c for mixing and smoothing outputs of the two comparators 32a, 32b. A delay circuit 33 delays the reference signal for the drum phase comparator 31a. A divided-by-two vertical reference signal generating circuit 34 generates a divided-by-two vertical reference signal by using the delay signal as a reference, and is used as a reference for a tracking control signal generated by a microcomputer 45. In addition, the configuration of this magnetic recording and reproducing apparatus further includes a video head amplifier 41 for amplifying the video signal; a video signal envelope detection circuit 42 for detecting the amplitude of a video signal converted to an FM signal; an A/D converter 43 for converting a video envelope detection signal, i.e., an analog signal, to a digital signal; and a memory circuit 44 for storing the digitized video envelope signal. The microcomputer 45 includes an arithmetic unit for performing such as a comparison between a digital envelope value outputted from the memory circuit 44 and a determined value set to an appropriate value, as well as a tracking control signal generator for generating control pulses.

The parts (a) to (g) of FIG. 2 are signal waveform diagrams of the respective parts shown in FIG. 1; FIG. 3 is a flowchart illustrating a controlling operation by the microcomputer; FIG. 4 is a waveform diagram explaining that operation; and FIG. 5 is a diagram illustrating a tracing path of the head during tracking control and reproduction in this embodiment.

A detailed description will now be given of the operation of this embodiment.

First, the drum frequency comparator 31b compares an FG signal (e.g., 720 Hz) of a drum frequency generator motor 8 and an output signal of the down-counter 30c which has counted down a 3.58 MHz reference oscillation signal. A drum PG pulse signal (30 Hz) for magnetically detecting the rotational phases of the heads by means of both the magnetic piece 18 mounted on the rotating drum 6 and the drum phase detecting head 19 is input to the drum flip-flop circuit 31c. The drum phase comparator 31a makes a comparison (shown in the part (b) of FIG. 2) between an output signal of the drum flip-flop circuit 31c (shown in the part (a) of FIG. 2) and an output signal of the down-counter phase correction circuit 30b which has corrected the phase by counting down the 3.58 MHz reference oscillation signal. Then, a signal obtained by smoothing and mixing both output signals of the drum frequency comparator 31b and the drum phase comparator 31a by means of the mixing filter circuit 31d is applied to the drum motor drive circuit 7, so as to cause the rotating drum 6 to rotate stably at 1,800 r.p.m. by controlling the speed and the phase.

On the other hand, the CP frequency comparator 32b makes a comparison between an FG signal (e.g., 720 Hz) of the capstan frequency generator (hereinafter referred to as the CP-FG) mounted on the capstan motor 9 and an output signal of the down-counter 30d which has counted down the 3.58 MHz reference oscillation signal. Meanwhile, a control signal is detected by the control head 5, and the CP phase comparator 32a makes a comparison between the control signal (shown in the part (g) of FIG. 2) amplified by the control signal amplifier 16 and the tracking control signal (shown in the part (e) of FIG. 2) generated by the microcomputer 45. Both output signals of the CP frequency comparator 32b and the CP phase comparator 32a are smoothed and mixed by the mixing filter circuit 31c, and the signal thus mixed is applied to the capstan motor drive circuit 11 so as to drive the capstan motor 9 at a stable tape speed by controlling the speed and the phase.

Meanwhile, the output signal (shown in the part (a) of FIG. 2) of the drum flip-flop circuit 31c is applied to the video head amplifier 41 as a magnetic head switching signal so as to switch over inputs from the magnetic heads 4A, 4B.

Then, the FM video signal amplified by the video head amplifier 41 is detected by the video signal envelope detection circuit 42, and the detected analog envelope detection signal is converted to a digital signal by the A/D converter 43 and is then stored in the memory circuit 44. As this A/D converter 43, it suffices to employ one which is capable of effecting processing with, for instance, 8 bits (256 stages) and a sampling frequency of 10 KHz or thereabouts, and the A/D converter 43 can be configured with a relatively low cost.

An output voltage value of the memory circuit 44 is applied to and calculated by the microcomputer 45. Furthermore, the microcomputer 45 generates the tracking control signal (shown in the part (e) of FIG. 2) by using as a reference the divided-by-two vertical reference signal (30 Hz) (shown in the part (d) of FIG. 2) generated by the divided-by-two vertical signal generating circuit 34, and applies this signal to the CP phase comparator 32a which compares the phase of that signal with the phase of the control pulse signal (shown in the part (g) of FIG. 2). The part (f) of FIG. 2 illustrates a signal waveform in the CP phase comparator 32a.

The operation of the microcomputer 45 will now be described in detail with reference to the flowchart of FIG. 3 and FIG. 4 which shows variations of a synthetic envelope value.

An envelope digital value of the video signal is input from the memory circuit 44 to the microcomputer 45, and effects the following arithmetic processing with respect to a level l of the envelope on the basis of this value. First, a starting point is set as $l_o$, and its envelope value is also set to $l_o$. A subtraction value p which is set to an appropriate value is subtracted from the value $l_o$, and the result is compared with an initially set determined value $j_0$. Since $j_0$ has been selected such that $j_0 < l_0$, we have $j_0 < l_0 - p$ Then, the determined value $j_0$ is set as $j_0=l_0-p$, and the amount of tracking is controlled in the negative direction to determine an envelope value $l_1$, and a comparison is made between $l_1-p$ and the determined value $j_0$. If the result is $l_1-p<j_0-p$, a similar comparison is effected consecutively with respect to envelope values $l_2$ and $l_3$. In cases where the results of the three steps are respectively smaller than the determined value $j_0$, i.e., if $$l_2-p<j_0$$

$$l_3-p<j_0$$

then the determined value $j_0$ is temporarily stored in a RAM of the microcomputer 45.

Subsequently, a point $l_a$ at which the envelope value 1 becomes the stored determined value $j_0$ is found. That is, a determination is made that even if an amount of tracking is searched in this negative direction, there is no maximum value of the envelope value 1. On the basis of this determination, a point at which $l_a=j_0=l_0-p$ is determined, and an amount of tracking at this time is assumed as point A and is stored in the RAM of the microcomputer 45.

Then, the amount of tracking is controlled in the positive direction (returned in the opposite direction) from point A, an envelope value $l_2$ is determined again and is compared by assuming $l_2-p$ as $j_2$. If the result is $j_2=l_2-p$, the amount of tracking is further searched in the positive direction so as to determine the envelope value $l_1$, which is compared with $j_2$. This operation repeated consecutively as follows:

$$l_1 - p > \quad j_2 = \quad l_2 - p$$
$$l_0 - p > \quad j_1 = \quad l_1 - p$$
$$l_{11} - p > \quad j_0 = \quad l_0 - p$$
$$l_{12} - p > \quad j_{11} = \quad l_{11} - p$$
$$\cdot \quad \quad \cdot \quad \quad \cdot$$
$$\cdot \quad \quad \cdot \quad \quad \cdot$$
$$\cdot \quad \quad \cdot \quad \quad \cdot$$
$$l_{15} - p > \quad j_{14} = \quad l_{14} - p$$
$$\cdot \quad \quad \cdot \quad \quad \cdot$$
$$\cdot \quad \quad \cdot \quad \quad \cdot$$
$$\cdot \quad \quad \cdot \quad \quad \cdot$$
$$l_{19} - p > \quad j_{18} = \quad l_{18} - p$$

Thus when $l_{20}$ at which point the envelope 1 begins to fall is reached, the result of comparison becomes $$l_{20}-p \leq j_{19}=l_{19}-p$$

In this manner, the amount of tracking is searched consecutively in the positive direction, and a comparison is made between the value of $l_n-p$ in which the predetermined value p is subtracted from the envelope value $l_n$ at each check point on the one hand, and the set determined value $j_n$ set by the preceding envelope value. If the former is greater than or equivalent to the latter, the searching operation is repeated, and if the former is smaller than the latter, the set determined value $j_n$ is temporarily stored in the RAM of the microcomputer 45 (in this example $j_{19}$ is stored). Then, the amount of tracking is further searched in the positive direction so as to determine a point $l_b$ at which the synthetic envelope value 1 becomes $j_{19}$. That is, the point at which $l_b=j_{19}=l_{18}=j_{14}$ is determined, and the amount of tracking at this time is assumed as point B and is stored in the RAM of the microcomputer 45.

Hence, it follows that the tracking points A and B are determined and are temporarily stored in the RAM. Then, an intermediate point between points A and B is set as an optimal tracking point, and the search is effected again from point B in the negative direction, and the tracking search is stopped and fixed at point C.

By using this point C as a reference, the tracking control signal (shown in the part (e) of FIG. 2) is generated by the tracking control signal generator of the microcomputer 4, and is applied to the CP phase comparator 32a.

The above-described steps are always carried out when the reproduction operation is commenced, but they are also repeated during reproduction when the synthetic envelope value 1 has fallen below a certain determined value j.

The tape speed and the amount of tracking are automatically adjusted to the recorded tape in a state in which the magnetic heads 4a, 4b are fixed at certain positions. Through this operation, the control signal is accurately coordinated with the position in which the head 4a jumps in or the head 4b jumps out in FIG. 5(a). The above-described operation is sufficient in cases where the recorded tracks have been recorded accurately in straight lines, as shown in FIG. 5(a). However, in cases where the tracks have been recorded in a curved state, as shown in FIG. 5(b), it is insufficient to control only the positions of jumping in and jumping out. A description will be given below of a mechanism for accurately tracing the curved recorded tracks shown in FIG. 5(b).

FIG. 6 is a vertical cross-sectional view illustrating a structure of a rotating drum unit in a magnetic recording and reproducing apparatus in accordance with the embodiment. With reference to FIG. 6, the rotary drum unit comprises the following component parts: a rotating drum 6a; a fixed drum 6b; an electrode brush 50 for applying a current to a coil in a movable head unit 100 which will be described later; a rotating slip ring 51; the drum motor 8; and the rotary transformer 21.

The movable head unit 100 serving as a magnetic head driving means, and at least this head unit 100 and an upper portion of the rotary transformer 21 are secured to the rotating drum 6a and rotate at a fixed speed of 1,800 r.p.m. by the rotation of the drum motor 8.

FIG. 7(a) is a perspective cross-sectional view illustrating an arrangement of the above-described movable head unit 100, and FIG. 7(b) is a vertical cross-sectional view thereof. In the drawings, reference numerals 101, 102 denote circular springs, the magnetic heads 4a, 4b being secured to one end of the circular spring 101. An air-core bobbin 103 is secured in central portions of the circular springs 101, 102. In addition, a coil 104 formed of a copper wire with a small diameter of 0.1 mm or thereabouts is wound around an outer periphery of the air-core bobbin 103.

A permanent magnet 105 is formed of rare earth cobalt or the like, a pole piece 106 is formed of a soft steel, and yokes 107, 108 are formed of a soft steel. The permanent magnet 105 is disposed in the air-core bobbin 103 and is secured to the yoke 108. These members constitute a driving mechanism for the magnetic heads 4a, 4b. Reference numeral 109 denotes a cap, while numeral 110 denotes a printed circuit board to which a lead wire of the coil 104 is connected.

FIGS. 8(a) and 8(b) denote enlarged top plan views respectively illustrating the aforementioned circular springs 101, 102. These two circular springs 101, 102 are so arranged that copper alloy plates 101A, 102A having a thickness of 0.08 mm are provided with a multiplicity of slits 101b, 102b, as shown in FIGS. 8(a) and 8(b), so as to impart soft, uniform resiliency thereto. Small moldings 101B, 102B are fitted on inner peripheries of their central holes, and the air-core bobbin 103 with the coil is secured therein. In addition, an elongated projecting piece 101a projecting from an outer periphery of the circular spring 101 is formed by providing slits in that outer periphery, the magnetic heads 4a, 4b being attached to a distal end of the projecting piece 101a.

As shown in FIG. 9, if S and N poles of the permanent magnet are provided on the upper and lower sides of the magnet and a current is allowed to flow through the coil 104, a magnetic force acts in the direction of arrow A in accordance with Fleming's left-hand rule. As a result, the air-core bobbin 103 moves downward. At this time, although the outer peripheries of the circular springs 101, 102 are secured to the yoke 107, since they have soft, uniform resiliency, the overall air-core bobbin 103 moves downward in proportion to the magnitude of the current.

In conjunction with the movement of the bobbin 103, the magnetic heads 4a, 4b attached to the elongated projecting piece 101a of the circular spring 101 move downward in parallel as they are in the direction of arrow A1. On the other hand, if the current flowing through the coil 104 is reversed in terms of its direction, the air-core bobbin 103 moves upward in parallel as indicated by arrow B contrary to the aforementioned case, and the magnetic heads 4a, 4b also move upward in parallel in the direction of arrow B1.

As is apparent from the foregoing explanation, since the magnetic heads 4a, 4b move vertically in parallel along the axial direction of the drums 6a, 6b, sliding surfaces of the tape and the magnetic heads 4a, 4b are constantly kept in contact with each other on the overall surfaces, which makes it possible to pick up the FM signal on the magnetic surface of the tape to a maximum degree, and the tape is prevented from becoming damaged by edges of the outer peripheral surfaces of the heads.

FIG. 10 is a block diagram of an electric circuit illustrating a configuration of a tracking correcting means in accordance with the embodiment.

With reference to FIG. 10, the A/D converter 43 converts an envelope detection output voltage to a digital signal. A microcomputer 132 outputs a digital data signal for controlling the magnetic heads 4a, 4b by means of respective timing input signals and mode output signals. In correspondence with respective coils 104a, 104b for driving the magnetic heads 4a, 4b, the microcomputer 132 is provided with scan signal basic waveform generating ROMs 132a, 132e; inclination angle correcting ROMs 132b, 132f; optimum track moving ROMs 132c, 132g for correcting the phases of scan signals with respect to the magnetic tape; and hill-climbing correction ROMs 132d, 132h. In addition, the microcomputer 132 is also provided with a swinging-back signal waveform generating ROM 132i for allowing the magnetic heads 4a, 4b to swing back during a period when they are not in contact with the magnetic tape. D/A converters 133a, 133b, 133c, 133d convert output signals corresponding to respective output ports of the microcomputer 132 into analog signals. Adders 134a, 134b add two analog signals output from the respective D/A converters 133a, 133b, 133c, 133d. A sequence control circuit 135 effects sequence control in various reproduction modes and includes a delay circuit 135a and a control circuit 135b. Low-pass filters 123a, 123b eliminate a high-frequency component. Driving amplifiers 124a, 124b for driving the magnetic heads 4a, 4b control the current flowing across the coils 104a, 104b.

Referring now to signal waveforms of the various components shown in FIG. 11, a description will be given of the operation of the above-described configuration.

A fixed head switching flip-flop signal FF shown in the portion (a) of FIG. 11 is input to the sequence control circuit 135. A magnetic head switching flip-flop signal MVFF shown in the portion (b) of FIG. 11 is delayed by a predetermined amount by the delay circuit 135a, and is then input to the microcomputer 132.

Now, if the recorded tape with curved tracks such as those shown in FIG. 5(b) is to be reproduced, a command for a reproducing operation is first output from the sequence control circuit 135. Then, the microcomputer 132 sends out the content of the scan signal basic waveform ROM 132a for designating an ideal value of a reproduction scanning pattern for the magnetic head 4a, among the built-in ROMs 132a–132i of the microcomputer 132. The waveform signal sent out from the scan signal basic waveform generating ROM 132a is applied to the coil 104a via the circuits 133a, 134a, 123a, 124a to ensure that the magnetic head 4a assumes a basic position for scanning the tracks.

This operation corresponds to the operation of portion A indicated by a broken line in the portion (c) of FIG. 11.

At this time, the signal of the track reproduced by the magnetic head 4a is subjected to envelope detection by the envelope detection circuit 42, a signal S converted to a digital signal by the A/D converter 43 is serially delivered to the microcomputer 132. Then the microcomputer 132 conducts a comparison between the aforementioned envelope detection signal S and the selected basic waveform of the scanning signal and effects calculation consecutively for each step, and then selects an optimum inclination-correction value among various correction values (about 30 kinds are requisite) set in advance in the inclination correcting ROM 132b. A scan signal to which this inclination correction signal is added by the adder 134a is applied to the coil 104a. As a result, the angle of inclination of the scanning path of the magnetic head 4a is corrected as indicated by the arrows with respect to the portion A in the portion (c) of FIG. 11.

Subsequently, an optimum track movement signal for selecting an optimum track to be reproduced is selected from the optimum track moving ROM 132c, and a drive signal to which this movement signal is added is applied to the coil 104a, thereby allowing the magnetic head 4a to scan the optimum track. In this case as well, the envelope detection signal S is applied to the microcomputer 132, and the selection of an optimum track is effected from this level.

Through the above-described operation, the magnetic head 4a scans a substantially optimum track. However, in order to allow the magnetic head 4a to trace the best position among optimum tracks, i.e., a position in which the level of the envelope signal becomes maximum, the so-called hill-climbing correction is effected for allowing an ideal scanning pattern to be displaced in parallel with the scanning path of the magnetic head 4a. This operation is demodulated by a regenerative signal processing circuit 113, and is offset by the hill-climbing ROM 132d in the microcomputer 132 by using as a reference a vertical synchronization signal V-SYNC separated by a V-sync separation circuit 125 in such a manner that the serial envelope detection signal S becomes a maximum value.

This operation corresponds to the operation indicated by a broken line with respect to portion B in the part (*d*) of FIG. 11. In FIG. 5(*b*), this operation corresponds to the operation of accurately pursuing an X value and conducting fine adjustment in a perpendicular direction to the video track so as to scan the center line of the recorded track during the scanning period for one field.

Although, in the above explanation of the operation, a description has been given with respect to the magnetic head 4a, the operation of the magnetic head 4b is effected in an identical manner. Specifically, the magnetic head 4b is driven by the operation of the scan signal basic waveform generating ROM 132e, the inclination angle correcting ROM 132f, the optimum track moving ROM 132g, the D/A converters 133c, 133d, the adder 134b, the LPF 123b, and the driving amplifier 124.

Then, when the magnetic head 4a has completed the scanning of the magnetic tape surface, and while the magnetic head 4b is scanning the magnetic tape surface, the magnetic head 4a does not abut against the tape surface and is idling. As for the behavior of the magnetic head 4a during the scanning period of this field, i.e., during the period when the magnetic head 4b is scanning one field on the magnetic tape, an optimum one of various predetermined swinging-back waveform values (about five kinds are requisite) set in the swinging-back signal waveform generating ROM 132i is selected and is delivered to the D/A converter 133a. This swinging-back signal waveform is indicated by portion C shown in the portion (*c*) of FIG. 11. If an inappropriate swinging-back signal waveform such as the one indicated by a broken line of portion C is selected, a large gap is created at the switching point of the MVFF signal, which causes the magnetic head 4a to displace by a large degree, thereby resulting in the occurrence of noise.

Thus, if the magnetic heads are driven during the half rotation of the drum in accordance with optimum ones of swinging-back signal waveforms of the swinging-back signal waveform generating ROM 132i, continuous, smooth driving is effected, as shown by the solid lines in the portions (*c*) and (*d*) of FIG. 11.

If the number of steps of the microcomputer 32 during the scanning period for one field is set at 256, as shown in FIG. 11, the magnetic heads are swung back and driven with a selected fixed pattern during steps 0–116 (1/30 Hz×116/256=approx. 15 msec.) of the microcomputer 132, and the microcomputer 132 effects calculation by comparing the envelope detection signal with the selected basic waveform of the scanning signal during the remaining steps 117–256, as shown in the portions (*c*) and (*d*) of FIG. 11, so as to effect the inclination angle correction and the hill-climbing correction in order that the magnetic heads accurately trace ensuing tracks. A waveform of the swinging-back signal for the next 15 msec. is selected on the basis of the envelope detection signal data, and the magnetic heads 4a, 4b are driven in such a manner that their regenerative signals are made substantially continuous.

It should be noted that although in the foregoing embodiments, with respect to the drum servo system and the capstan servo system, a specific example of configuration which is generally called a digital servo circuit has been shown, but the present invention is not restricted to the same and is applicable extensively to analog servo systems as well.

In addition, although a point C located more closely to a central portion than the points (points A and B) for setting the amount of tracking was set as a tracking point, it goes without saying that an arbitrary point may be selected as the tracking point.

Furthermore, since various internal configurations of the microcomputer 132 are conceivable, the present invention is not necessarily restricted to the configurations of the above-described configurations.

The two microcomputers 132, 135 shown in the above-described embodiments may be configured with one microcomputer.

If the number of the kinds of waveform values set in the basic waveform generating ROMs 132a, 132e, 132i provided in the microcomputer is increased so as to be able to effect a finer selection in response to the envelope detection signal, control can be effected with a smaller amount of inclination correction within a shorter period of convergence and with higher accuracy, thereby permitting noise to disappear speedily. Thus it is possible to obtain a VTR capable of reproducing a completely noiseless picture.

As described above, the arrangement provided in this embodiment is such that the magnetic heads mounted on the rotating drum are first fixed at certain positions, the tape speed and the amount of tracking are determined so that the FM envelope value becomes maximum, and then the magnetic heads are moved to effect tracing by following the linearity during the scanning period for one field. Accordingly, even if the recorded tracks on the magnetic tape are slightly curved, it is possible to trace the recorded tracks fully and accurately and pick up the regenerative FM signal to a maximum degree. In addition, it is possible to minimize crosstalk components from adjacent tracks. Hence, there is the advantage that a full-trace type automatic tracking system for a VTR designed for high picture quality can be provided.

What is claimed is:

1. A magnetic recording and reproducing system including apparatus for reproducing from a track recorded on a magnetic tape made to travel by being driven by a capstan, said apparatus comprising:

a rotating drum;

a magnetic head provided on said rotating drum in such a manner as to project from an outer peripheral portion thereof by a predetermined amount;

detection means for subjecting a signal read from the track by said magnetic head to envelope detection and converting the signal to a digital envelope signal;

tracking controlling means responsive to the digital envelope signal for controlling the driving by said capstan such that the intensity of the digital envelope signal output from said detection means becomes substantially maximum;

correction means also responsive to the digital envelope signal for outputting a tracking correction signal such that the intensity of the digital envelope signal output from said detection means becomes maximum; and magnetic head driving means responsive to the tracking correction signal for causing said magnetic head to be displaced along the rotational axis of said rotating drum on the basis of the tracking correction signal so as to trace the track; and wherein said detection means comprises:

a head amplifier for amplifying the signal read from the track by said magnetic head;

an envelope detection circuit for detecting the envelope of the amplified signal; and an A/D converter for converting an analog envelope signal to a digital envelope signal;

wherein said correction means further comprises:

a basic waveform memory in which a plurality of scan signal basic waveform data for designating an ideal scanning pattern for the track of said magnetic head are stored;

an inclination correction memory in which a plurality of correction values for correcting an angle of inclination of the ideal scanning pattern with respect to the magnetic tape are stored;

an optimum track moving memory in which a plurality of correction values for correcting a phase of the ideal scanning pattern with respect to the magnetic tape are stored;

a hill-climbing correction memory in which a plurality of displacement values for causing the ideal scanning pattern to be displaced substantially perpendicularly to a scanning direction;

a processor adapted to effect a comparison between the scan signal basic waveform data and the digital envelope signal from said detection means for each predetermined step, and to read appropriate correction values from said inclination correction memory and said optimum track moving memory, respectively, and an appropriate displacement value from said hill-climbing correction memory on the basis of the result of said comparison;

a D/A converter for converting the scan signal basic waveform and the correction values and displacement value read to analog signals, respectively; and an adder for adding the analog correction signal and the analog displacement signal to the analog scan signal basic waveform signal so as to generate a tracking correction signal; and wherein said magnetic head driving means further comprises:

a yoke;

an upper and lower coaxial annular spring secured to said yoke, the upper annular spring additionally having a projecting portion at the peripheral edge thereof, said magnetic head being affixed to said projecting portion;

an air-core bobbin having an upper portion affixed to a central portion of said annular springs;

a permanent magnet mounted on said yoke disposed in aid air-core bobbin; and an energizing coil wound around an outer periphery of said air-core bobbin and adapted to cause said air-core bobbin to be displaced substantially along the rotational axis of said rotating drum upon being subjected to magnetic interaction between said energizing coil and said permanent magnet by means of the tracking correction signal.

2. The system of claim 1 wherein said yoke comprises an assembly of metallic elements including a cup type bottom member for supporting said permanent magnet, an intermediate member secured to said bottom member and having a pair of inner shoulder surfaces for supporting said upper and lower annular springs, and an upper annular cap member secured to said intermediate member having a central axial opening therein for permitting unobstructed axial displacement of said bobbin.

3. The system of claim 2 wherein said upper annular spring is larger in diameter than said lower annular spring and wherein said inner shoulder surfaces of said intermediate member of the yoke comprises stepped shoulder surfaces.

4. A magnetic recording and reproducing system including apparatus for reproducing from a track recorded on a magnetic tape made to travel by being driven by a capstan, said apparatus comprising:

a rotating drum;

a magnetic head provided on said rotating drum in such a manner as to project from an outer peripheral portion thereof by a predetermined amount;

detection means for subjecting a signal read from the track by said magnetic head to envelope detection and converting the signal to a digital envelope signal;

tracking controlling means responsive to the digital envelope signal for controlling the driving by said capstan such that the magnitude of the digital envelope signal output from said detection means becomes substantially maximum;

correction means also responsive to the digital envelope signal for outputting a tracking correction signal such that the intensity of the digital envelope signal output from said detection means becomes maximum, said correction means further comprising, (a) a basic waveform memory in which a plurality of scan signal basic waveform data for designating an ideal scanning pattern for the track of said magnetic head are stored, (b) an inclination correction memory in which a plurality of correction values for correcting an angle of inclination of the ideal scanning pattern with respect to the magnetic tape are stored, (c) an optimum track moving memory in which a plurality of correction values for correcting a phase of the ideal scanning pattern with respect to the magnetic tape are stored, (d) a hill-climbing correction memory in which a plurality of displacement values for causing the ideal scanning pattern to be displaced substantially perpendicularly to a scanning direction, (e) a processor adapted to effect a comparison between the scan signal basic waveform data and the digital envelope signal from said detection means for each predetermined step and to read appropriate correction values from said inclination correction memory and said optimum track moving memory, respectively, and an appropriate displacement value from said hill-climbing correction memory on the basis of the result of said comparison, (f) to D/A converter for converting the scan signal basic waveform and the correction values and displacement value read to analog signals, respectively, and (g) an adder for adding the analog correction signal and the analog displacement signal to the analog scan signal basic waveform signal so as to generate a tracking correction signal; and magnetic head driving means responsive to the tracking correction signal for causing said magnetic head to be displaced along the rotational axis of said rotating drum on the basis of the tracking correction signal so as to trace the track.

5. A magnetic recording and reproducing system according to claim 4, wherein said detection means comprises:
- a head amplifier for amplifying the signal read from the track by said magnetic head;
- an envelope detection circuit for detecting the envelope of the amplified signal; and
- an A/D converter for converting an analog envelope signal to a digital envelope signal.

6. A magnetic recording and reproducing system according to claim 4, wherein said tracking controlling means comprises:
- a memory for storing data of the digital envelope signal from said detection means;
- a processor for calculating a position in which the intensity of the envelope signal becomes substantially maximum on the basis of the envelope signal data stored;
- a tracking signal generating circuit for generating a tracking signal corresponding to the position calculated by said processor;
- a capstan phase comparator for effecting a comparison of phase between the tracking signal and a control signal from a control track recorded in advance on the magnetic tape; and
- a capstan driving circuit for driving said capstan on the basis of the result of the phase comparison.

7. A magnetic recording and reproducing system according to claim 4, further comprising a swinging-back waveform memory in which a plurality of swinging-back signal waveform data for causing said magnetic head to swing back to its original position are stored.

8. A magnetic recording and reproducing system according to claim 4, further comprising:
- an oscillator for generating a reference signal of a predetermined frequency;
- a down-counter for counting down the reference signal;
- a frequency comparator for effecting a comparison between the frequency of the counter-down reference signal and a frequency of said rotating drum;
- a phase comparator for effecting a comparison between a phase of the counter-down reference signal and a phase of said rotating drum; and
- a driving circuit for driving said rotating drum in response to the result of the frequency comparison and the result of the phase comparison.

9. A magnetic recording and reproducing system including apparatus for reproducing from a track recorded on a magnetic tape made to travel by being driven by a capstan, said apparatus comprising:
- a rotating drum;
- a magnetic head provided on said rotating drum in such a manner as to project from an outer peripheral portion thereof by a predetermined amount;
- detection means for subjecting a signal read from the track by said magnetic head to envelope detection and converting the signal to a digital envelope signal;
- tracking controlling means responsive to the digital envelope signal for controlling the driving by said capstan such that the magnitude of the digital envelope signal output from said detection means becomes substantially maximum;
- correction means also responsive to the digital envelope signal for outputting a tracking correction signal such that the intensity of the digital envelope signal output from said detection means becomes maximum; and
- magnetic head driving means responsive to the tracking correction signal for causing said magnetic head to be displaced along the rotational axis of said rotating drum on the basis of the tracking correction signal so as to trace the track, said magnetic head driving means further comprising, (a) a yoke, (b) a pair of coaxial annular springs secured to the yoke, one of said annular springs having a projecting portion at one end thereof, said magnetic head being affixed to said projecting portion, (c) an air-core bobbin having an upper portion affixed to a central portion of both said annular springs, (d) a permanent magnet disposed in said air-core bobbin, and (e) an energizing coil wound around an outer periphery of said air-core bobbin and adapted to cause said air-core bobbin to be displaced along the rotational axis of said rotating drum upon being subjected to magnetic interaction between said energizing coil and said permanent magnet by means of the tracking correction signal.

10. A magnetic recording and reproducing system including apparatus for reproducing from a track recorded on a magnetic tape made to travel by being driven by a capstan, said apparatus comprising:
- a rotating drum;
- a magnetic head provided on said rotating drum in such a manner as to project from an outer peripheral portion thereof by a predetermined amount;
- detection means for subjecting a signal read from the track by said magnetic head to envelope detection and converting the signal to a digital envelope signal, said detection means further comprising, (a) a head amplifier for amplifying the signal read from the track by said magnetic head, (b) an envelope detection circuit for detecting the envelope of the amplified signal, and (c) an A/D converter for converting an analog envelope signal to a digital envelope signal;
- tracking controlling means responsive to the digital envelope signal for controlling the driving by said capstan such that the magnitude of the digital envelope signal output from said detection means becomes substantially maximum;
- correction means also responsive to the digital envelope signal for outputting a tracking correction signal such that the intensity of the digital envelope signal output from said detection means becomes maximum, said correction means further comprising, (d) a basic waveform memory in which a plurality of scan signal basic waveform data for designating an ideal scanning pattern for the track of said magnetic head are stored, (e) an inclination correction memory in which a plurality of correction values for correcting an angle of inclination of the ideal scanning pattern with respect to the magnetic tape are stored, (f) an optimum track moving memory in which a plurality of correction values for correcting a phase of the ideal scanning pattern with respect to the magnetic tape are stored, (g) a hill-climbing correction memory in which a plurality of displacement values for causing the ideal scanning pattern to be displaced substantially perpendicularly to a scanning direction, (h) a processor adapted to effect a comparison between the scan signal basic waveform data and the digital envelope signal from said detection means for each predetermined step and to read appropriate correction values from said inclination correction memory and said optimum track moving memory, respectively, and an appropriate displacement value from said hill-climbing correction memory on the basis of the result of said comparison, (i) a D/A converter for converting the scan signal basic waveform and the correction values and displacement value read to analog signals, respectively, and (j) an adder for adding the analog correction signal and the analog displacement signal to the analog scan signal basic waveform signal so as to generate a tracking correction signal; and magnetic head driving means responsive to the tracking correction signal for causing said magnetic head to be displaced along the rotational axis of said rotating drum on the basis of the tracking correction signal so as to trace the track, said magnetic head driving means further comprising, (k) a yoke including an intermediate portion having a pair of inner support surfaces, (l) an upper and lower coaxial annular spring secured to said support surfaces, the upper annular spring additionally having a projecting portion at an outer end thereof, and said magnetic head being affixed to said projecting portion, (m) an air-core bobbin having an upper portion affixed to a central portion of both said annular springs, (n) a permanent magnet disposed in said air-core bobbin, and (o) an energizing coil wound around an outer periphery of said air-core bobbin and adapted to cause said air-core bobbin to be displaced substantially along the rotational axis of said rotating drum upon being subjected to magnetic interaction between said energizing coil and said permanent magnet by means of the tracking correction signal.

* * * * *